United States Patent [19]

Sittel et al.

[11] Patent Number: 4,778,835
[45] Date of Patent: Oct. 18, 1988

[54] PROCESS AND APPARATUS FOR PREPARING POLYESTER DISSIPATIONS

[75] Inventors: Chester N. Sittel, Kingsport; Mark A. Pollock, Johnson City, both of Tenn.

[73] Assignee: Eastman Kodak Company, Rochester, N.Y.

[21] Appl. No.: 940,824

[22] Filed: Dec. 12, 1986

Related U.S. Application Data

[63] Continuation-in-part of Ser. No. 807,077, Dec. 9, 1985, abandoned, which is a continuation-in-part of Ser. No. 689,366, Jan. 7, 1985, abandoned, which is a continuation of Ser. No. 498,443, Mar. 26, 1983, abandoned.

[51] Int. Cl.$^4$ .......................... C08J 3/00; C08J 79/00
[52] U.S. Cl. .......................... 523/315; 264/9; 264/11; 366/67; 366/69; 523/324; 523/326; 524/601; 524/602; 524/603; 524/604; 528/499
[58] Field of Search ............... 264/9, 11; 523/315; 524/602, 603, 604

[56] References Cited

U.S. PATENT DOCUMENTS

| | | | |
|---|---|---|---|
| 2,613,156 | 10/1952 | McGaffin et al. | 106/198 |
| 3,647,493 | 3/1972 | Gresch et al. | 106/187 |
| 3,779,993 | 12/1973 | Kibler et al. | 524/198 |
| 4,056,653 | 11/1977 | Gebhard | 428/402 |
| 4,217,145 | 8/1980 | Gaddis | 106/170 |
| 4,329,305 | 5/1982 | McClain | 264/9 |
| 4,440,664 | 4/1984 | Pollock | 521/177 |

Primary Examiner—A. Lionel Clingman
Attorney, Agent, or Firm—John F. Stevens; William P. Heath, Jr.

[57] ABSTRACT

A process and apparatus for preparing a homogeneous dissipation of a viscous, liquid-dissipatable polymer. The process comprises continuously feeding molten polymer into a first inlet of a mixing chamber, feeding a stream of a relatively low viscosity dissipating liquid into a second inlet of said mixing chamber at an angle, at a velocity and at a flow rate relative to the structure of said chamber such that shearing action is created at the advancing end of the polymer to continuously erode the end of the polymer, and further mixing the polymer and dissipating liquid downstream from an outlet of the chamber to form a homogeneous dissipation of polymer in dissipating liquid.

11 Claims, 2 Drawing Sheets

PROCESS AND APPARATUS FOR PREPARING POLYESTER DISSIPATIONS

This is a continuation-in-part of Ser. No. 807,077 filed Dec. 9, 1985 and abandoned, which in turn is a continuation-in-part of Ser. No. 689,366, filed Jan. 7, 1985 and abandoned, which is a continuation of Ser. No. 498,443, filed May 26, 1983, now abandoned.

BACKGROUND OF THE INVENTION

The present invention provides an improved process and apparatus for preparing dissipations of liquid-dissipatable polymers. Such polymers are well known in the art and include cellulosic polymers, acrylic polymers, polyesters, etc. While it is known that such polymers as these form dissipations in appropriate liquids, previously known processes for preparing such dissipations have proved inadequate.

For example, a commonly employed dissipation technique involves extruding a polymer as molten strands into an agitated open tank of a desired solvent. This system must be highly agitated in order to achieve the desired dissipation; however, the extrusion rate and mixer speed must be critically controlled in order to avoid balling of the polymer on the agitator. Furthermore, such prior art processes impose limitations upon the compositional ranges of dissipations which can be prepared thereby.

In contrast, the present invention provides a process and apparatus whereby dissipations can be prepared rapidly with a minimum of capital investment. In the case of polymers, there is no significant loss in polymer inherent viscosity (I.V.) during operation of the process. Furthermore, the composition of the polymer dissipation can be varied from very high to very low concentrations of polymer in the dissipating liquid. Also, the particle size distribution is improved. As used herein, the term "dissipate" and variations thereof is intended to mean both "dissolve" and "disperse" and combinations thereof.

The present invention provides a process and apparatus for preparing dissipations of liquid-dissipatable polymers. The process can, in a continuous manner, prepare stable, excellent dissipations by contacting the polymer and dissipating liquid by mixing them under conditions and for a time sufficient to dissipate the material in the liquid.

DESCRIPTION OF THE INVENTION

Figure 1:
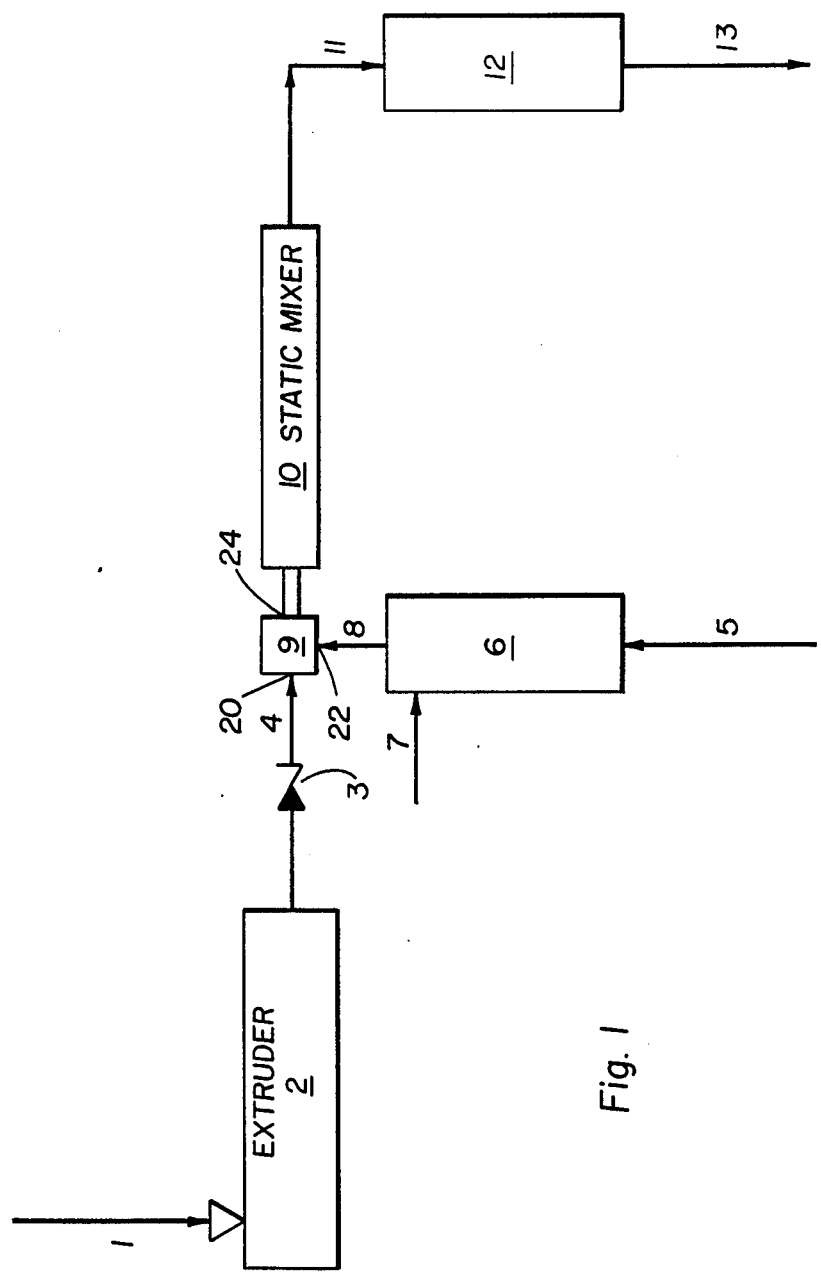
FIG. 1 is a schematic flow diagram illustrating the process of the present invention.
Figure 2:
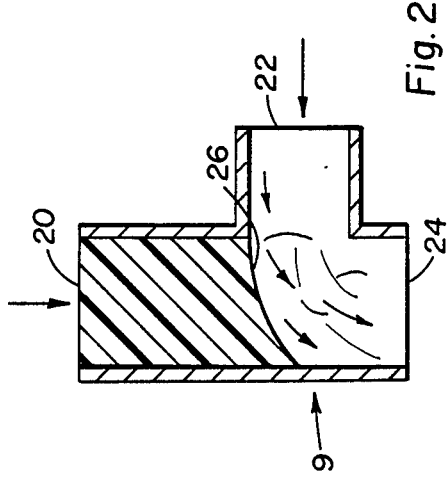
FIG. 2 is a sectional view of a mixing chamber according to this invention.
Figure 3:
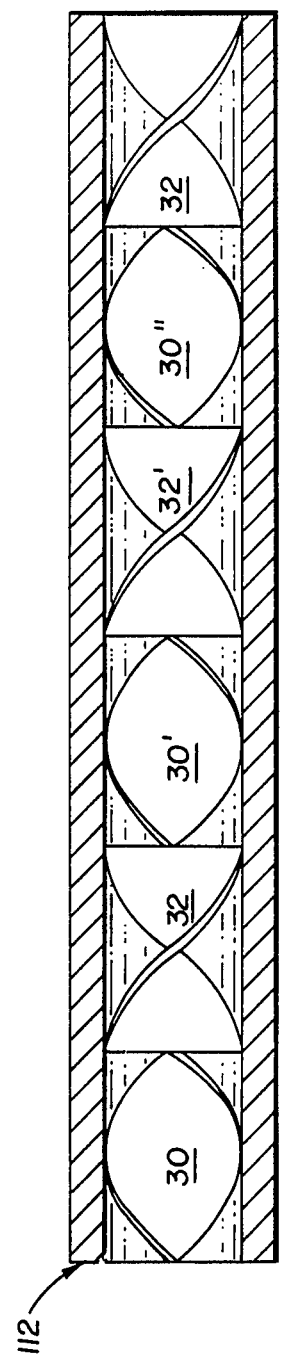
FIG. 3 is a sectional view of a static mixer used in accordance with the present invention.

According to the present invention there is provided a process for preparing a homogeneous dissipation of a viscous, liquid-dissipatable polymer which comprises the steps of:
(a) continuously feeding the polymer into a first inlet of a mixing chamber,
(b) feeding a stream of a relatively low viscosity dissipating liquid into a second inlet of said mixing chamber at an angle, at a velocity and at a flow rate relative to the structure of said chamber such that shearing action is created at the advancing end of said polymeric material to disperse said material, and
(c) further mixing the polymer and the dissipating liquid downstream from an outlet of the chamber to form a homogeneous dissipation of the polymer in the dissipating liquid.

According to another aspect of this invention, there is provided an apparatus for preparing a homogeneous dissipation of a liquid-dissipatable polymer comprising
(a) a mixing chamber having a first inlet for polymer to be dissipated, a second inlet for dispersing liquid, and an outlet for a mixture of the polymer and the dissipating liquid,
(b) means for feeding the liquid-dissipatable polymer and the dispersing liquid into the inlets and withdrawing a mixture thereof from the outlet, the direction of feed, volume and velocity of dissipating liquid with respect to the liquid-dissipatable polymer being such that shearing action is created at the advancing end of liquid-dissipatable polymer to disperse the polymer,
(c) a conduit extending from the outlet, and
(d) means within the conduit to cause further vigorous mixing of the mixture emerging from the outlet as it flows therethrough to form a homogeneous dissipation.

The viscous, liquid-dissipatable polymer which is dissipated may be any polymer which is subject to being dissipated by the shearing action of a relatively low viscosity liquid. It is believed that the polymer material is dissipated by erosion caused by a shearing action due to turbulence of the dissipating liquid. Polymers which are in a plastic or semi-plastic state are examples of such a material. The term "polymer" is intended to include polymers, copolymers, terpolymers, etc. Polyesters extruded in molten form are of particular interest. The liquid-dissipatable polymeric material used in the present invention is further described as being swellable and plasticizable by the dissipating liquid. It is important that the polymeric material be plasticized prior to being solidified by the dissipating liquid. It is surprising that this can be accomplished without significant degradation (hydrolysis) of the polymeric material. The polymeric material enters the mixing chamber in a molten state, and the dissipating liquid is at a temperature well below the melting point of the polymeric material. Typically, for molten polymeric material entering the mixing chamber at temperatures of about 240°–300° C., the liquid-dissipating liquid will enter the mixing chamber at temperatures of about 70°–120° C. Thus, by the simultaneous cooling and plasticization of the polymeric material, an intolerable increase in its viscosity is avoided. Of special interest are water dissipatable polymers comprising repeating units from:
(a) at least one dicarboxylic acid;
(b) at least one difunctional sulfomonomer containing at least one metal sulfonate group attached to an aromatic nucleus wherein the functional groups are hydroxy, carboxyl or amino; and
(c) a glycol or a mixture of a glycol and diamine having two —NRH groups, the glycol containing two —CH$_2$—OH groups at least a part of which is a poly(ethylene glycol) having the structural formula:

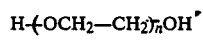

n being an integer of between 2 and about 500.

Such polyesters and their preparation are described in detail in U.S. Pat. No. 3,779,993, incorporated herein by reference.

Although the term "molten" is used, it should be understood that the outer layer of the extrudate is simultaneously cooled (possibly below its melting point) and plasticized as it contacts the relatively cool dissipating liquid. Normally, such material will be continuously extruded or fed into the first inlet of the mixing chamber. The dissipating liquid may be a solvent or a nonsolvent for the liquid dissipatable polymer. However, in all cases it is capable of plasticizing the polymer. During such plasticization, the viscosity and glass transition temperature are lowered.

Referring to the drawings, FIG. 1 is a diagram illustrating the process and apparatus of this invention. Pellets of the liquid-dissipatable polymer are fed by way of line 1 into the extruder 2 where they are melted. The molten polymer is fed through check valve 3 and line 4 into inlet 20 of mixing chamber 9. Dissipating liquid (typically water) is fed into a second inlet 22 of the mixing chamber 9 through line 8 at an angle, at a velocity and at a flow rate relative to the structure of the chamber such as to continuously erode the end of the polymer. Turbulence is created at the advancing end of the molten material to cause shear forces to act on the end 26 of the polymer. The resulting dissipation exits the chamber 9 at outlet 24, and enters a static mixing section 10 where further mixing occurs. From the static mixer 10, the dissipation is fed through line 11 into cooling means 12 and is carried away for further processing through line 13.

The mixing chamber is illustrated in the drawings in the form of a "tee", where polymer to be dissipated is fed into one branch or first inlet 20 and its mixture with the dissipating liquid exists through an outlet 24 collinear therewith. Dissipating liquid enters through an inlet 22 which is generally at right angles to first inlet 20 and outlet 24. Inlet 22 may be between about 45° and 180° relative to the directions of flow at said first inlet 20 and the outlet 24. If the inlets were at 180° to each other, then, obviously the chamber could still be in the form of a tee, but inlets would be opposite each other and the outlet would be at right angles to the inlets. Typically, the inlets and outlets are circular in cross-section, such as a pipe fitting.

It should be understood that the chamber design illustrated in the drawings may be modified by those skilled in the art. Chamber 9 is designed such that turbulence of the dissipating liquid will be created at the end 26 of the polymeric material to be dissipated. Not only must the chamber be designed to create turbulence, but the flow rate and velocity of dissipating liquid must be such as to induce turbulence at the end 26 of the polymer.

The dissipating liquid may conveniently be water or another liquid of similar viscosity such as acetone or a lower alcohol (e.g., methanol, ethanol, etc.), i.e., about ½ to about 50 cps. It may also be a solvent for the material to be dissipated. Typically, the T-shaped mixing chamber will have inlets 20 and 22 of about ¼-2 inches in diameter. A typical flow rate of liquid into inlet 22 would be about 5 liters per minute using polyester and water. Downstream from the outlet 24, the mixer 10 serves to promote turbulence at the leading end 26 of the plastic mass.

The mixer 10 may conveniently be of the static type comprising an arrangement of baffles inside the conduit. Useful mixers include Kenics and Koch mixers, well known to those skilled in the art.

The Kenics mixer is disclosed in U.S. Pat. No. 3,286,992 incorporated herein by reference. It is an inline, no-moving-part, continuous mixing and processing unit. The unit is constructed of a number of short elements of right and left-hand helices 30, 30', 30'', 32, 32' and 32''. These elements are alternated and oriented so that each leading edge is at 90° to the trailing edge of the one ahead. In general, the length of the individual element is approximately 1.5 diameters. The element assembly is then enclosed within a tubular housing.

Of course, it will be apparent to those skilled in the art that plural mixing chamber and/or downstream mixers may be used in parallel or in series.

Although various liquid-dissipatable polymers and dissipating liquid may be used in the present invention, particular interest is in the use of a water-dissipatable polyester as the liquid dissipatable polymer and water as the dissipating liquid, and this will form the basis of the disclosure which follows.

It is further contemplated that liquid systems containing other components, for example, inorganic salts, starches, colorants, pigments, carbon particles and the like may be used in the present process. Such systems may be advantageous in the preparation of dissipations having specific end uses.

Water-dissipatable polyesters are well known in the art and have been described in the literature. For example, water-dissipatable polyesters are disclosed and claimed in U.S. Pat. No. 3,779,993, which is incorporated herein by reference in its entirety. Of the various water-dissipatable polyester compositions disclosed therein, the ones which are deemed to be most advantageous for use in the process of the present invention are those comprising units derived from isophthalic acid, 5(sodiosulfo)isophthalic acid, diethylene glycol, and/or 1,4-cyclohexanedimethanol.

A water-dissipatable polyester composition which is especially suitable for use in the process of the present invention comprises units derived from diethylene glycol, isophthalic acid, and 5(sodiosulfo)isophthalic acid wherein the molar ratio of isophthalic acid to 5(sodiosulfo)isophthalic acid is about 9:1. This composition is illustrated by formula I below:

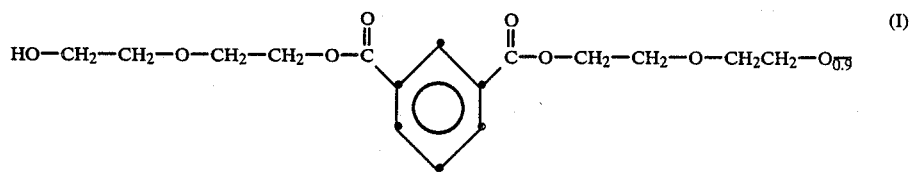

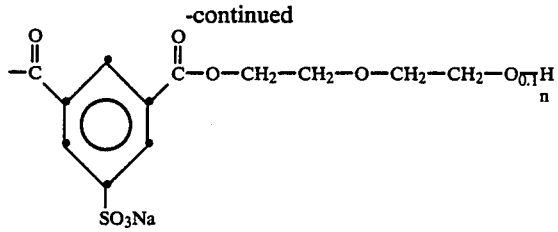

Another preferred water-dissipatable polyester composition comprises units derived from isophthalic acid, 5(sodiosulfo)isophthalic acid, 1,4-cyclohexanedimethanol, and diethylene glycol, wherein the molar ratio of 1,4-cyclohexanedimethanol to diethylene glycol is about 1:1 to about 1:4 and the molar ratio of isophthalic acid to 5(sodiosulfo)isophthalic acid is about 4:1 to 15:1. A specific composition of this type is represented by Formula II below:

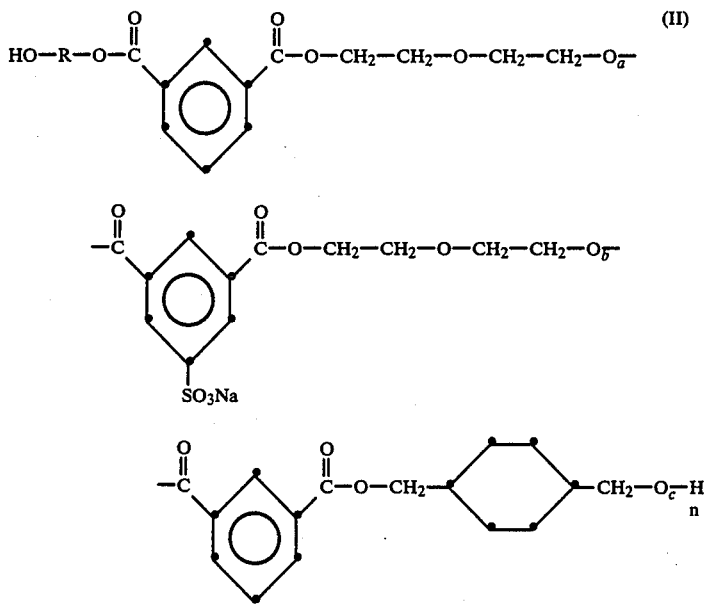

wherein R represents units derived from 1,4-cyclohexanedimethanol and diethylene glycol and wherein the ratio of a:b:c is about 6.5:1:2, and n is about 40.

The preferred water-dissipatable polyesters exhibit an I.V. of about 0.1 to 0.75 (preferably about 0.3 to 0.6) when measured at 25° C. at a concentration of 0.25 g of polymer in 100 ml of 60:40 phenol:tetrachloroethane.

The polymer is first heated to a preselected plasticization temperature. At such temperatures, it would be expected that such polymer would exhibit a high degree of degradation (e.g., by hydrolysis). However, as will be further discussed below, such high degrees of degradation are not observed during the process of the present invention. The plasticization temperature to which the polymer is heated will depend upon such factors as the nature of the particular polymer, the liquid to be used in preparing the dispersion, the conditions under which the heated polymer is subsequently contacted with the liquid, etc. Typically, a plasticization temperature which is about 5° to 20° C. above the melt temperature of the polymer is preferred. For the water-dispersible polyesters described above, a plasticization temperature of about 250° to 275° C. has been found to be desirable. A convenient and readily available means of heating the polymer and providing it to the subsequent contacting step is by means of an extruder. Another convenient means of providing preheated polymer comprises a gear pump located at the outlet of a polymer reactor. Other convenient systems will be apparent to the skilled artisan.

After the polymer has been heated, the polymer is then contacted with a stream of dispersing liquid under conditions of temperature, pressure, and shear which are sufficient to accomplish rapid plasticization of the polymer. It is contemplated that the liquid, prior to contact with the polymer, will be at a somewhat elevated temperature which is, however, significantly below that of the heated polymer. Thus, upon contact with the polymer, rapid adiabatic cooling of the polymer occurs. Therefore, it is necessary for there to be a rapid rate of contact of the solvent and the heated polymer in order to plasticize the polymer with the solvent before a significant increase in viscosity of the polymer due to its rapid cooling is observed. This rapid contact can be achieved by contacting the liquid and the polymer under conditions of elevated liquid pressure. Rapid plasticization of the polymer is further enhanced by providing conditions of high shear. Thus, it is desirable to contact the liquid with the polymer under conditions of elevated temperature, elevated pressure, and high shear. In preferred embodiments, the liquid is provided at a temperature such that the temperature of the contact with the solvent is in the range of about 100° to 170° C., preferably about 120° to 150° C. In the case of water-dissipatable polyesters, the water which is used as solvent is provided at a temperature of about 80° to 150° C. and a pressure of about 100 to 500 psig.

The pressure and temperature at which the dissipating liquid must be provided typically are interdependent upon each other. That is, as the temperature of the liquid is increased, the pressure under which it must be provided in order to achieve rapid plasticization can be decreased. Conversely, as the liquid temperature is lowered, the pressure which is necessary to accomplish rapid plasticization is increased.

By contacting the dispersing liquid with the heated polymer under the conditions described above, initial plasticization of the polymer with the liquid is achieved before a substantial increase in the viscosity of the polymer is exhibited, despite the rapid cooling of the polymer. In this manner, gel formation during preparation of the dispersion is avoided. In addition, the period of time during which the polymer is subjected to elevated temperatures can be kept to a minimum, thereby aiding in the prevention of degradation by hydrolysis, or otherwise.

Upon initial plasticization of the polymer, the polymer is further mixed more thoroughly in the desired concentration with the liquid at a desired temperature. The temperature employed in the mixing step should be selected so as to favor formation of a homogeneous dispersion without causing polymer degradation. Such a temperature typically will be intermediate between that of the pre-heated polymer and that of the liquid prior to contact with the heated polymer. In preferred embodiments, the mixing is accomplished adiabatically. In such an adiabatic process, the mixing temperature will be the temperature resulting from contact of the heated polymer with the liquid, as for example, preferably about 120° to 150° C. Alternatively, the mixing zone may be heated or cooled as necessary to achieve the desired mixing temperature. As mentioned above, the temperature at which the polymer and the liquid are mixed is preferably in the range of about 120° to 150° C., although somewhat higher or lower temperatures can be employed under certain conditions, as discussed further below.

The mixing downstream from the mixing chamber 9 can be accomplished by any of a number of well known turbulence-inducing devices. Such devices include static mixers, gear pumps, shear pumps, screen packs, extruders, compounders, steam injection, water injection, gas injection, mixed tanks, centrifugal pumps, ultrasonic mixers, etc. Still other means of accomplishing mixing can be envisioned by the person of ordinary skill in the art. Especially preferred as the means of accomplishing adiabatic mixing is the use of static mixers. Such devices are well known and are widely available commercially. Commercial static mixers which are suitable for use in the present process also include Koch SMV, Koch SMX, and Ross ISG static mixers.

The polymer and the liquid are subjected to mixing for a period of time such that a homogeneous dissipation is formed and degradation of the polymer is prevented. At the temperatures described above (i.e., about 120° to 150° C.), the polymer and the liquid can be mixed for periods of time up to about 15 minutes. However, homogeneous dispersions can be formed in much shorter periods of time, for example, on the order of 20 seconds to one minute or less.

It has been observed that a time/temperature relationship exists during the mixing step. That is, at higher temperatures in the mixing zone, shorter mixing times are required to form a homogeneous dissipation. Conversely, at lower mixing temperatures, greater periods of time are required in order to achieve a homogeneous dissipation. Thus, in the formation of a dissipation from the polymer represented by Formula I and water, at temperatures of about 150° C., a residence time in the mixing zone of about ten seconds has been found to be sufficient to prepare a homogeneous dissipation. For the dissipation system described immediately above, temperatures in the mixing zone as high as 170° C. can be employed. At such an elevated temperature, a residence time in the mixing zone of less than about one second is sufficient to accomplish the preparation of a homogeneous dissipation.

During the mixing step, and particularly when relatively high temperatures are employed, degradation of the polymer can possibly occur. Thus, the residence time in the mixing zone must be sufficiently short so as to avoid such degradation.

In the case of water dissipatable polyesters described herein in particular, the polyester such as that represented by Formula I above, is fed by way of line 1 to extruder 2. Molten polymer at a temperature of about 250° to 275° C. exits from the extruder through check valve 3 by way of line 4. Water is fed by way of line 5 to heating unit 6 to which steam under about 90 psig pressure is also fed by way of line 7. Water at a temperature of about 100° C. and a pressure of about 300 psig is fed by way of line 8 to mixing tee 9. In mixing tee 9, polymer from line 4 and hot water from line 8 are contacted under shear conditions which are sufficient to rapidly plasticize the polyester. The plasticized polyester is forced from the mixing tee into mixing zone 10. Mixing zone 10 contains a plurality of static mixing elements, such as Koch SMV or SMX static mixers, Ross ISG static mixers, or other such devices. In mixing zone 10, the plasticized polyester and the water are mixed at a temperature of about 120° to 150° C. for a period of time less than about 20 seconds. A resulting homogeneous dispersion is then fed by way of line 11 to cooling zone 12. A homogeneous dissipation at a convenient processing temperature (i.e., about 40° C.) is removed from cooling zone 12 by means of line 13. System pressure control can be implemented in either line 11 or line 13 by means of e.g., a pressure relief valve. Throttling in line 11 has the advantage of increased tendency to destroy (homogenize) any surviving gel particles.

By means of the process described above, polymer dissipations can be conveniently prepared over a wide range of concentrations. The process of the present invention can be employed to prepare dissipations in which the weight percent solids is as low as about 1% or as high as about 75%. Preferably, the dissipations prepared by the process of the present invention exhibit a weight percent solids in the range of about 1 to 50% (more preferably, about 20 to 45 weight percent solids). The concentration of the dissipations prepared by the process of the present invention can be readily adjusted by varying the respective feed rates of preheated polymer and solvent to the contacting zone. Such adjustments are well within the skill of the ordinary artisan.

Thus, the present invention provides a versatile process for preparing dissipations of polymers. Such dissipations can be prepared by the present process without the use of large, expensive agitation equipment. The dissipations can be formed quickly while avoiding degradation of the polymers. Furthermore, high residence times in agitating equipment are obviated, thereby further reducing the likelihood of degradation of the polymer. In addition, by means of the present process, homogeneous dissipations can be prepared which do not exhibit the problem of gel formation.

While not wishing to be bound by theoretical considerations, it appears that these advantages of the process of the present invention are due in large measure to turbulence-induced erosion and to the rapid initial plasticization of the polymer with the liquid. This rapid plasticization avoids subjecting the polymer to elevated temperatures for long periods of time by means of the rapid cooling of the polymer which is involved. Gel formation is reduced by initially plasticizing the preheated polymer with dissipating liquid in such a manner as to avoid rapid increases in polymer viscosity. In this manner, agglomerization of solid polymer particles in plugs or balls is avoided. After the polymer has been initially plasticized with solvent, the compatibility of the polymer and the solvent are further enhanced. Further plasticization and preparation of a homogeneous dissipation from the plasticized polymer and the dissipating liquid can then be accomplished in the mixing zone quickly and easily.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 10 pounds per hour of a water dissipatable polyester containing about 90 mole percent isophthalic acid, 10 mole percent dimethyl 5(sodiosulfo)isophthalate and 100 mole percent diethylene glycol is fed to the extruder and extruded at a temperature of 260° C. and an extruder pressure of 2000 psig to the mixing tee and contacted with 21.25 pounds per hour of water at a temperature of 100° C. and 200 psig and mixed in the mixing zone at a temperature of about 130° C. and an exit pressure of about 80 psig for about 13 seconds. The dissipation is then cooled to about ambient temperature and on analysis contains 32 percent by weight polyester and 68 percent water. The dissipation was clear and had a pale yellow color and did not separate out on standing at ambient temperature for six months.

A part of this dissipation was frozen and on remelting remained a dissipation which shows that this dissipation is stable.

EXAMPLE 2

About 10 pounds per hour of a water dissipatable polyester containing about 89 mole percent isophthalic acid, 11 mole percent 5(sodiosulfo)isophthalic acid and 100 mole percent diethylene glycol is fed to the extruder and extruded at a temperature of 260° C. and an extruder pressure of 2000 psig to the mixing tee and contacted with 12.22 pounds per hour of water at a temperature of 100° C. and 300 psig and mixed in the mixing zone at a temperature of about 146° C. and an exit pressure of about 100 psig for about 20 seconds. The dissipation is then cooled to about ambient temperature and on analysis contains 45 percent by weight polyester and 55 percent water. The dissipation was clear and had a yellow color and did not separate out on standing.

EXAMPLE 3

About 10 pounds per hour of a water dissipatable polyester containing about 90 mole percent isophthalic acid, 10 mole percent 5(sodiosulfo)isophthalic acid and 100 mole percent diethylene glycol is fed to the extruder and extruded at a temperature of 260° C. and an extruder pressure of 2000 psig to the mixing tee and contacted with 25.71 pounds per hour of water at a temperature of 129° C. and 400 psig and mixed in the mixing zone at a temperature of about 150° C. and an exit pressure of about 100 psig for about 11 seconds. The dissipation is then cooled to about ambient temperature and contains 28 percent by weight polyester and 72 percent water. The dissipation had a light transmission of 53.7%, a yellowness index of 64.5% and a haze of 39.4% as measured on a XL-835 colorimeter using a 4-ounce French Square sample bottle. This shows that the sample was clear and had a pale yellow color. The sample did not separate out on standing.

EXAMPLE 4

About 10 pounds per hour of a water dissipatable polyester containing about 90 mole percent isophthalic acid, 10 mole percent 5(sodiosulfo)isophthalic acid and 100 mole percent diethylene glycol is fed to the extruder and extruded at a temperature of 260° C. to the mixing tee and contacted with 61.43 pounds per hour of water at a temperature of 130° C. and 300 psig and mixed in the mixing zone at a temperature of about 140° C. and a pressure of about 90 psig for about 6 seconds. The dissipation is then cooled to about 35° C. and contains 14 percent by weight polyester and 86 percent water. The dissipation was clear and had a slight yellow color and did not separate out on standing.

The dissipations prepared according to the present invention are useful in many different applications. Such dissipations can be in the form of latexes for paints and the like. These dissipations can also be colored as pigmented and used as inks for printing and the like.

While the invention has been described in detail with particular reference to preferred embodiments thereof, it will be understood that variations and modifications can be effected within the spirit and scope of the invention.

What is claimed is:

1. A process for preparing a homogeneous dissipation of a viscous, liquid-dissipatable polyester or copolyester which comprises the steps of:
   (a) continuously feeding molten polyester or copolyester into a first inlet of a mixing chamber,
   (b) feeding a stream of a relatively low viscosity dissipating aqueous liquid into a second inlet of said mixing chamber at an angle between about 45° and about 180° relative to the direction of flow of the molten polyester, at a velocity and at a flow rate relative to the structure of said chamber such that shearing action is created at the advancing end of said polyester or copolyester to continuously erode the end of said polyester or copolyester, and
   (c) further mixing said polyester or copolyester and said dissipating aqueous liquid downstream from an outlet of said chamber to form a homogeneous dissipation of said polyester or copolyester in said dissipating aqueous liquid.

2. Process according to claim 1 wherein said viscous, liquid-dissipatable material is a water dissipatable polymer comprising repeating units from:

(a) at least one dicarboxylic acid;
(b) at least one difunctional sulfomonomer containing at least one metal sulfonate group attached to an aromatic nucleus wherein the functional groups are hydroxy, carboxyl or amino; and
(c) a glycol or a mixture of a glycol and diamine having two —NRH groups, the glycol containing two —CH$_2$—OH groups at least a part of which is a poly(ethylene glycol) having the structural formula:

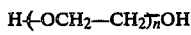

$$H\text{-}(OCH_2\text{--}CH_2)_n OH$$

n being an integer of between 2 and about 500.

3. Process according to claim 1 wherein said dissipating liquid is water.

4. Process according to claim 1 wherein said first inlet and said outlet are generally collinear, and said second inlet is positioned so as to cause flow of said stream of dissipating liquid at an angle between about 45° and 180° relative to the directions of flow at said first inlet and said outlet.

5. Process according to claim 1 wherein the mixing chamber is T-shaped, the branches thereof being generally circular in cross-section, said first inlet being a branch thereof generally axially colinear with said outlet branch.

6. Process according to claim 1 wherein said viscous, liquid-dissipatable polyester or copolyester is of a consistency such that a predetermined velocity and flow rate of said stream of relatively low viscosity dissipating liquid acquires sufficient shearing action in the mixing chamber to erode the end of said liquid-dissipatable polymer or copolymer.

7. Process according to claim 1 wherein said dissipating aqueous liquid is a solvent for said liquid-dissipatable polymer or copolymer.

8. Process according to claim 1 wherein said dissipating aqueous liquid is a non-solvent for said liquid-dissipatable polymer or copolymer.

9. Process according to claim 1 wherein said liquid-dissipatable polyester or copolyester is heated to a temperature about 5° to about 20° C. above its melt temperature and said dissipating liquid is water at a temperature of about 80° to about 100° C. and under a pressure of about 75 to 250 psig.

10. Process according to claim 1 wherein said homogeneous dissipation is further mixed downstream from said mixing chamber.

11. A process for preparing a homogeneous, aqueous dissipation of a water dissipatable polyester or copolyester wherein said polyester or copolyester comprises repeating units from
(a) at least one dicarboxylic acid;
(b) at least one difunctional sulfomonomer containing at least one metal sulfonate group attached to an aromatic nucleus wherein the functional groups are hydroxy, carboxyl or amino; and
(c) a glycol or a mixture of a glycol and diamine having two —NRH groups, the glycol containing two —CH$_2$—OH groups at least a part of which is a poly(ethylene glycol) having the structural formula:

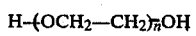

$$H\text{-}(OCH_2\text{--}CH_2)_n OH$$

n being an integer of between 2 and about 500, said process comprising the steps of:
(a) continuously extruding a plastic mass of said polyester or copolyester into a first inlet of a mixing chamber,
(b) continuously feeding a stream of water into a second inlet of said mixing chamber, the flow of water from said second inlet being of a direction between about 45° and about 180°, velocity and rate with respect to the feed of said plastic mass that shearing action is created at the advancing end of said plastic mass to cause continuous erosion of the end of said plastic mass, and
(c) further mixing said polyester or copolyester and said water downstream from the outlet of said chamber to form a homogeneous dissipation of said polyester in said water.

* * * * *